United States Patent
Nott et al.

(10) Patent No.: US 12,164,941 B2
(45) Date of Patent: *Dec. 10, 2024

(54) IMAGE PATTERN MATCHING TO ROBOTIC PROCESS AUTOMATIONS

(71) Applicant: UiPath, Inc., New York, NY (US)

(72) Inventors: Brandon Nott, Bellevue, WA (US); Christian Berg, Seattle, WA (US); Vaclav Skarda, Domazlice (CZ)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,618

(22) Filed: Oct. 2, 2023

(65) Prior Publication Data

US 2024/0028354 A1 Jan. 25, 2024

Related U.S. Application Data

(63) Continuation of application No. 17/370,145, filed on Jul. 8, 2021, now Pat. No. 11,809,883.

(51) Int. Cl.
  *G06F 9/451* (2018.01)
  *G06F 18/22* (2023.01)
  *G06N 20/00* (2019.01)

(52) U.S. Cl.
  CPC .............. *G06F 9/451* (2018.02); *G06F 18/22* (2023.01); *G06N 20/00* (2019.01)

(58) Field of Classification Search
  CPC ...... G06F 9/451; G06F 18/22; G06F 9/45512; G06N 20/00; G06Q 10/0633; G06V 10/778; G06V 30/19007; G06V 10/82; G06V 10/75
  See application file for complete search history.

(56) References Cited

U.S. PATENT DOCUMENTS

| | | | |
|---|---|---|---|
| 8,977,627 | B1 | 3/2015 | Vijayanarasimhan et al. |
| 9,569,213 | B1 | 2/2017 | Brandt |
| 2006/0184410 | A1 | 8/2006 | Ramamurthy et al. |
| 2011/0320240 | A1 | 12/2011 | Flores et al. |
| 2013/0007580 | A1 | 1/2013 | Belfiore et al. |
| 2013/0007599 | A1 | 1/2013 | Belfiore |
| 2017/0060580 | A1 | 3/2017 | Brandt |
| 2018/0074931 | A1 | 3/2018 | Garcia et al. |
| 2018/0081717 | A1 | 3/2018 | Li |
| 2019/0332686 | A1 | 10/2019 | Lee |
| 2020/0134374 | A1 | 4/2020 | Oros |

(Continued)

OTHER PUBLICATIONS

Supplementary European Search Report received in EP Application No. 21801405, dated Aug. 14, 2023, 2 pages.

(Continued)

*Primary Examiner* — Matthew Ell
*Assistant Examiner* — Alvaro R Calderon, IV
(74) *Attorney, Agent, or Firm* — Volpe Koenig

(57) ABSTRACT

Disclosed herein is a computing system. The computing system includes a memory and a processor. The memory stores processor executable instructions for a workflow recommendation assistant engine. The processor is coupled to the memory. The processor executes the workflow recommendation assistant engine to cause the computing device to analyze images of a user interface corresponding to user activity, execute a pattern matching of the images with respect to existing automations, and provide a prompt indicating that an existing automation matches the user activity.

18 Claims, 6 Drawing Sheets

(56) References Cited

U.S. PATENT DOCUMENTS

| | | |
|---|---|---|
| 2020/0159499 A1 | 5/2020 | Bodin et al. |
| 2020/0180155 A1 | 6/2020 | Hall |
| 2021/0103767 A1 | 4/2021 | Berg et al. |
| 2021/0110527 A1 | 4/2021 | Wheaton |
| 2021/0124610 A1 | 4/2021 | Gardner et al. |
| 2021/0366099 A1 | 11/2021 | Liao |

OTHER PUBLICATIONS

International Search Report and Written Opinion for PCT/US2021/056867 dated Apr. 6, 2022, 7 pages.

IMAGE PATTERN MATCHING TO ROBOTIC PROCESS AUTOMATIONS

CROSS-REFERENCE TO RELATED APPLICATIONS

This Application is a continuation of U.S. application Ser. No. 17/370,145, filed Jul. 8, 2021, the contents of which are hereby incorporated by reference in their entirety.

BACKGROUND

The disclosure herein relates to the field of robotic process automation (RPA), and particularly to image pattern matching to RPAs.

Conventional operating and software systems can include script automation of user activity. Script automation, generally, is a process of leveraging existing scripts to deliver automation of user activity in a managed framework (i.e., without having to do custom script development and maintenance). Yet, script automation is limited to one to one sequential user action mimicking and has no way of providing an intelligent automation experience for user activity.

SUMMARY

According to one or more embodiments, a computing system is provided. The computing system includes a memory and at least one processor. The memory stores processor executable instructions for a workflow recommendation assistant engine. The at least one processor is coupled to the memory. The at least one processor is configured to execute the workflow recommendation assistant engine to cause the computing device to analyze images of a user interface corresponding to user activity, execute a pattern matching of the one or more images with respect to at least one existing automation, and provide a prompt indicating that the at least one existing automation matches the user activity.

According to one or more embodiments, the computing system embodiment above can be implemented as a method, an apparatus, a device, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

Disclosed herein is a workflow recommendation assistant engine ("recommendation engine"). The recommendation engine includes software and/or hardware for image pattern matching to robotic process automations (RPAs) or the like. That is, the recommendation engine can be implemented in a computing system through a combination of hardware and software (e.g., processor executable code that is necessarily rooted in the hardware).

According to one or more embodiments, the recommendation engine can provide a specific configuring and tooling robotic process automation method with respect to the intelligent automation experience. The intelligent automation experience includes using robot intelligence (e.g., machine learning and artificial intelligence) to perform background monitoring/analyzing of user activity for purposes of identifying and presenting RPAs to be used by users. The background/analyzing monitoring can include capturing images of the user activity (e.g., images around the user activity or as screen shots), while the identifying and presenting of the RPAs includes processing the captured images to detect and suggest RPA matches (e.g., pattern matching).

For example, the configuring and tooling robotic process automation method by the recommendation engine includes providing a lightweight service (e.g., low system resource usage, such as a small memory footprint and a low CPU usage) running in a background (e.g., exists outside a workflow) of a software system that takes hashes of what a user is doing (e.g., captures images), sequences the hashes, and executes the hashes (e.g., in and/or out of sequence) against a repository of existing automations to determine whether there is a match. If the configuring and tooling robotic process automation method determines that there is a match, then the recommendation engine can suggest to the user that there is an existing automation (e.g., an RPA or the like) that does what the user is doing (e.g., mimics the user activity), along with providing an opportunity for the user to view, select, and/or start the existing automation.

Thus, the configuring and tooling robotic process automation method of the recommendation engine involves a multi-step data manipulation of captured images, interface components, data, and configurations in connection with the software system. One or more technical effects, advantages, and benefits of the recommendation engine include providing the intelligent automation experience for user activity to users that are otherwise not available with conventional script automation.

Figure 1:
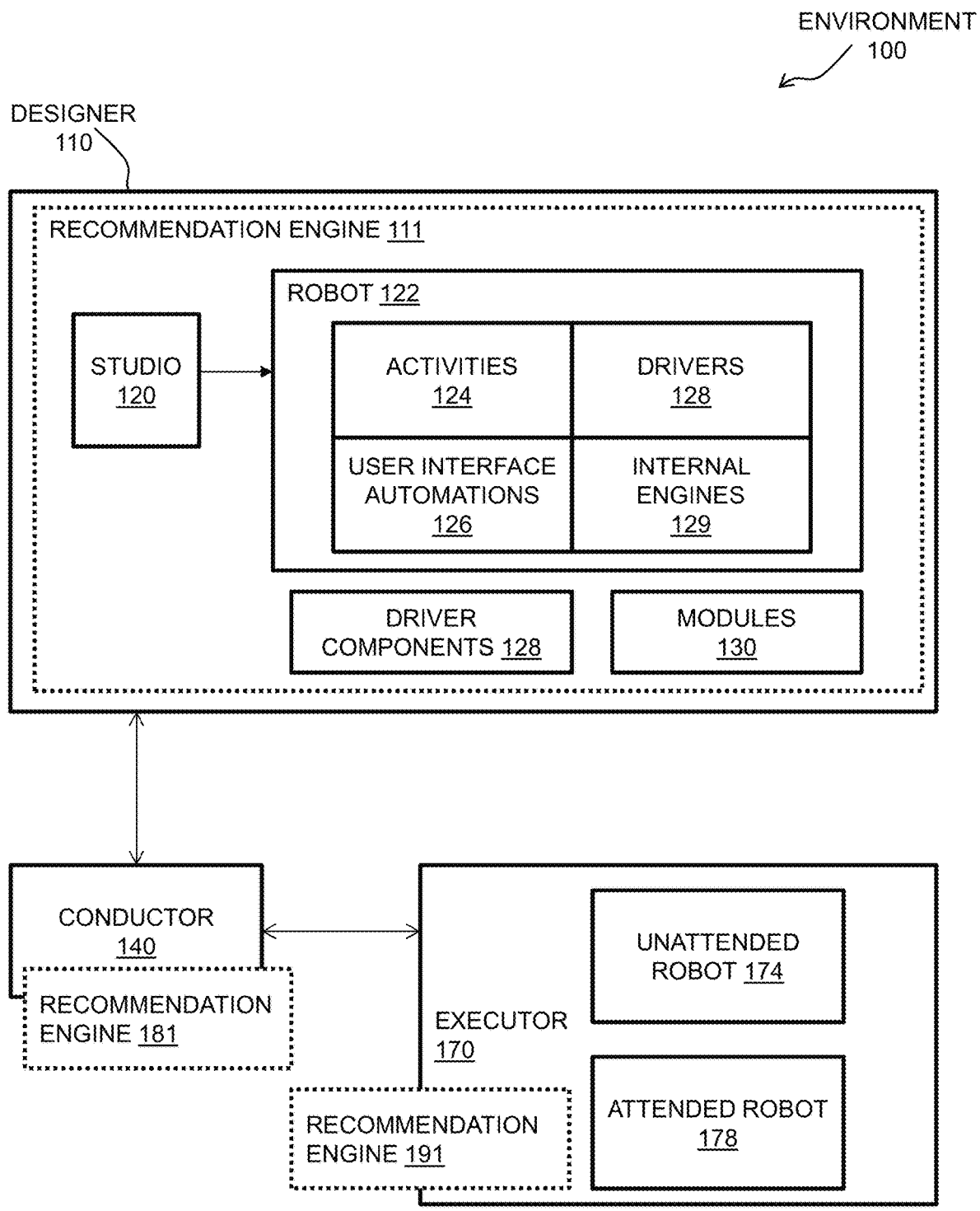
FIG. 1 depicts an environment illustrating development, design, operation, and/or execution of robotic process automations (RPAs) according to one or more embodiments.

FIG. 1 depicts an environment 100 illustrating development, design, operation, and/or execution of robotic process automations (RPAs) according to one or more embodiments. The environment 100 can be a design and deployment computing platform that includes one or more components. Note that while a single block is shown for each of the one or more components of the environment 100, that single block is representative of one or more of that component.

As shown, the environment 100 can include a designer 110 that further includes a workflow recommendation assistant engine ("recommendation engine") 111. The recommendation engine 111 can include a studio component or module 120 that produces one or more robots (e.g., a robot 122) that perform one or more activities 124 and/or provide one or more user interface (UI) automations 126 using one or more driver components 128 and/or internal engines 129. The robot 122 may also engage with other driver components 131 and modules 132 within the designer 110 as well.

Further, the environment 100 can include a conductor 140 and an executor 170, which can download/acquire/transmit the robot 122 so that the robot 122 can be provided in the environment 100 as an unattended robot 174 and an attended robot 178 of the executor 170.

The designer 110, the conductor 140, and the executor 170 are representative of computing devices, computing apparatuses, and/or computing systems, which comprise hardware, software, or a combination thereof. The designer 110, the conductor 140, and the executor 170, and any software thereon (e.g., the recommendation engine 111) are configured to interact with a user or an operator so as to receive inputs and provide outputs. In an example, the executor 170 can be or implement mobile computing and/or mobile device environments.

According to one or more embodiments, the designer 110 can be referred to as a studio platform, a development platform, and/or an online platform. The designer 110 can include one or more engines (e.g., the recommendation engine 111), development environments (e.g., the studio 120), or the like and can be configured to generate code, instructions, commands, or the like for a robot (e.g., the one or more robots 122, the unattended robots 174, and the attended robots 178) to perform or automate one or more workflows (e.g., the one or more activities 124 and/or provide the one or more UI automations 126).

The recommendation engine 111, generally, is software and/or hardware that implements robotic process automation. In this regard, the recommendation engine 111 is detailed as a dotted box to illustrate a scalability and a portability of the recommendation engine 111 within the environment 100. For example, the recommendation engine 111 can be implemented as separate instances throughout the environment 100, as shown by the recommendation engines 181 and 191.

Further, in accordance with one or more embodiments, the recommendation engine 111 can be part of a framework/mechanism (e.g., the environment 100) that automatically implements codes and designs the robot 122 within the studio 120. The recommendation engine 111 can also enable developers and/or orchestrators (e.g., a user or operator) to code, program, and/or design the robot 122, such as through the studio 120. In an embodiment, the studio 120 can provide application integration, along with automating of third-party applications, administrative information technology (IT) tasks, and/or business IT processes. Generally, the recommendation engine 111 can include robot intelligence that looks at a known set of captured images (e.g., little pictures) against presently captured images, aligns sequences, determines if there is a match thereto, and supports presents the matches.

The robot 122 (and the unattended robots 174 and the attended robots 178) may be an application, applet, script, or the like that may perform and/or automate one or more workflows (e.g., represented in part by the one or more activities 124 and/or provide the one or more UI automations 126). A workflow may include, but are not limited to, task sequences, flowcharts, Finite State Machines (FSMs), global exception handlers, UI transparents, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like. UI transparents can be software operations to an underlying operating system (OS) or hardware. Non-limiting examples of operations that can be accomplished by one or more workflows may be one or more of performing log-ins, filling a form, information technology (IT) management, or the like. To run a workflow for UI automation, the robot 122 may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

According to one or more embodiments, at development, the robot 122 can be produced at/by the designer 110 (e.g., the studio 120). Further, at deployment, the robot 122 may be managed, controlled, configured or the like at/by the conductor 140 (e.g., within the recommendation engine 181). At deployment, the robot 122 may also be executed within the executor 170. In an example, a user input (e.g., a selection on a display) can be submitted by a user or an operator to the designer 110. From the selection, which the designer 110 may provide to the robot 122, the robot 122 may determine representative data of area(s) of a visual display (e.g., selected by the user or the operator). As part of RPAs, shapes (e.g., squares, rectangles, circles, polygons, freeform, or the like) in multiple dimensions may be utilized for UI robot development and runtime in relation to a computer vision (CV) operation and/or a machine learning (ML) model.

According to one or more embodiments, UI automations 126 may be performed by the robot 122 using the drivers 128 therein, and the recommendation engine 111 can perform activities using the modules 130 (e.g., CV activities module or engine). The driver components 132 may be utilized for UI automation by the robot 122 to get elements of a UI. The driver components 132 may include, but are not limited to, OS drivers, browser drivers, virtual machine drivers, enterprise drivers, and the like. In certain configurations, the modules 130 may be a driver used for UI automation. Further, any of these actions by the robot 122 can be implemented on a client (e.g., as the unattended robots 174 and the attended robots 178 of the executor 170).

The conductor 140 may instruct or command the robots 122, 174, and 178 or the executor 170 to execute or monitor a workflow in a mainframe, web, virtual machine, remote machine, virtual desktop, enterprise platform, online platform, desktop app(s), browser, or the like client, application, or program. The conductor 140 may act as a central or semi-central point to instruct or command one or more robots (e.g., the robots 122, 174, and 178) to automate a computing platform (e.g., the environment 100).

In accordance with one or more embodiments, the conductor 140 may be configured for provisioning, deployment, configuration, queueing, monitoring, logging, and/or providing interconnectivity. Provisioning may include creating and maintenance of connections or communication between the one or more robots, the executor 170, and conductor 140. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). The conductor 140 may provide interconnectivity by acting as the centralized point of communication for third-party solutions and/or applications.

According to one or more embodiments, the one or more robots and the executor 170 may be configured as the unattended robot 174 and/or the attended robot 178. For unattended operations, automation by the unattended robot 174 may be performed without third party inputs or control. For attended operations, automation by the attended robot 178 may be performed by receiving input, commands, instructions, guidance, or the like from a third party component. The unattended robot 174 and/or the attended robot 178 may run or execute on mobile computing or mobile device environments.

According to one or more embodiments, the one or more robots and the executor 170 may be configured as execution agents that run workflows built in the designer 110. A commercial example of a robot(s) for UI or software automation is UiPath Robots™. In some embodiments, the one or more robots and the executor 170 may install the Microsoft Windows® Service Control Manager (SCM)-managed service by default. As a result, such robots can open interactive Windows® sessions under the local system account, and have the rights of a Windows® service.

According to one or more embodiments, the one or more robots and the executor 170 may be installed in a user mode. For example, the one or more robots may have the same rights as a user under which a given robot is installed. This feature may also be available for High Density (HD) robots, which ensure full utilization of each machine at maximum performance such as in an HD environment.

According to one or more embodiments, the one or more robots and the executor 170 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between the conductor 140 and execution hosts (i.e., the computing systems on which the one or more robots are executed). These services may be trusted with and manage the credentials for the one or more robots and the executor 170. User mode robot services may manage and monitor Windows® sessions and act as a proxy between conductor 140 and the execution hosts. User mode robot services may be trusted with and manage the credentials for robots. A Windows® application may automatically be launched if the SCM-managed robot service is not installed. In an example, the executor 170 may run given jobs under a Windows® session (e.g., they may execute workflows described herein) and may be aware of per-monitor dots per inch (DPI) settings. Agents may be Windows® Presentation Foundation (WPF) applications that display available jobs in a system tray window. Agents may be a client of the service. Agents may request to start or stop jobs and change settings. The command line may be a client of the service. The command line is a console application that can request to start jobs and waits for their output.

According to one or more embodiments, configurations where components of the one or more robots and/or the executor 170 are split helps developers, support users, and computing systems more easily run, identify, and track execution by each component. Special behaviors may be configured per component this way, such as setting up different firewall rules for the executor 170 and a service. The executor 170 may be aware of DPI settings per monitor in some embodiments. As a result, workflows may be executed at any DPI, regardless of the configuration of the computing system on which they were created. Projects from the designer 110 may also be independent of browser zoom level. For applications that are DPI-unaware or intentionally marked as unaware, DPI may be disabled in some embodiments.

Figure 2:
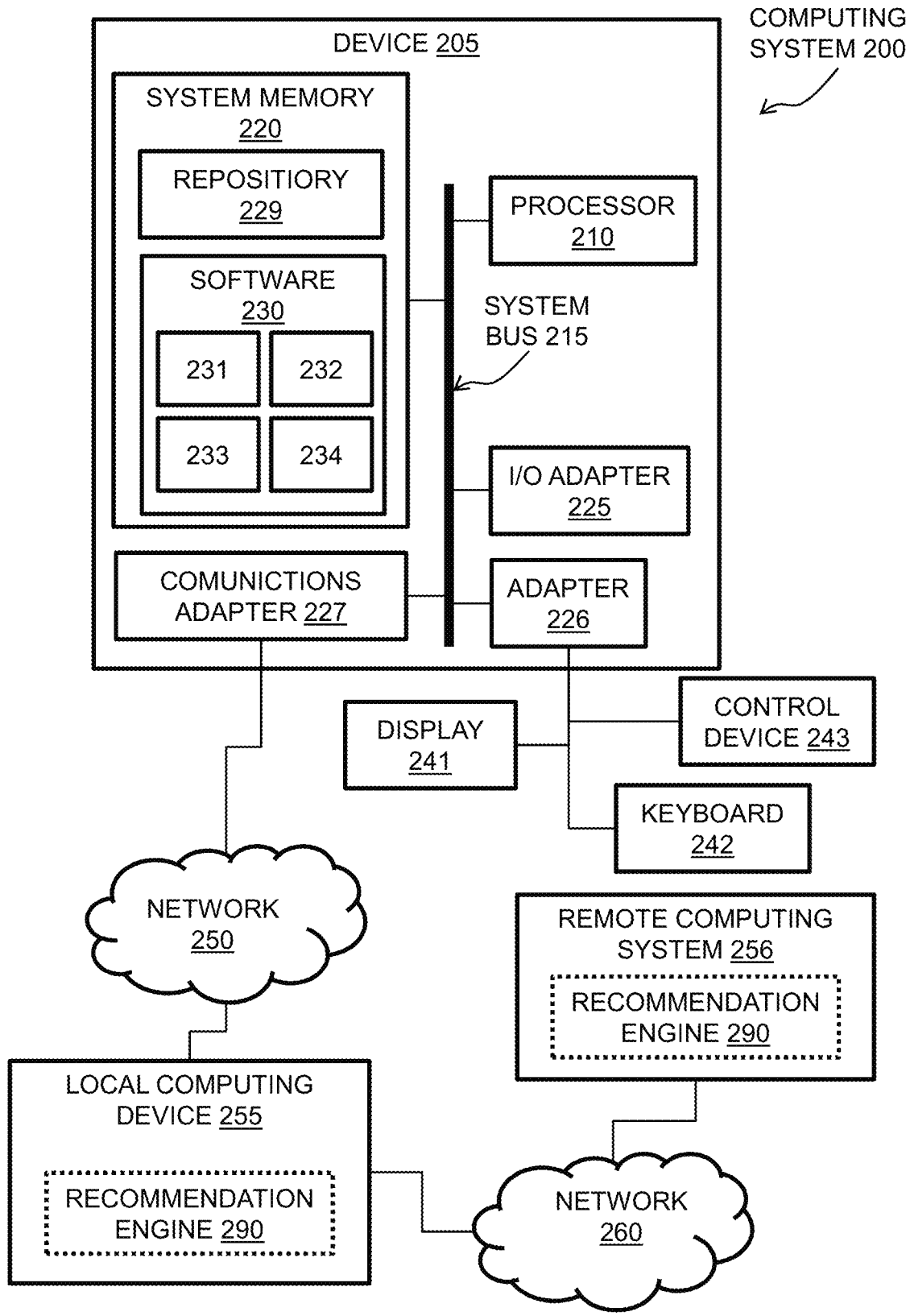
FIG. 2 is an illustration of a computing system according to one or more embodiments.

Turning now to FIG. 2, a computing system 200 is illustrated according to one or more embodiments. The computing system 200 can be representative of any computing device, computing apparatus, and/or computing environment, which comprise hardware, software, or a combination thereof (e.g., hardware supporting the recommendation engines 111, 181, and 191 of FIG. 1). Further, embodiments of the computing system 200 disclosed may include apparatuses, systems, methods, and/or computer program products at any possible technical detail level of integration.

The computing system 200 has a device 205 (e.g., the designer 110, the conductor 140, and the executor 170 of FIG. 1) with one or more central processing units (CPU(s)), which are collectively or generically referred to as a processor 210. The processor 210, also referred to as processing circuits, is coupled via a system bus 215 to a system memory 220 and various other components. The computing system 200 and/or the device 205 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The processor 210 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 210 may also have multiple processing cores, and at least some of the cores may be configured to perform specific functions. Multi-parallel processing may also be configured. In addition, at least the processor 210 may be a neuromorphic circuit that includes processing elements that mimic biological neurons.

The bus 215 (or other communication mechanism) is configured for communicating information or data to the processor 210, the system memory 220, and various other components, such as the adapters 225, 226, and 227.

The system memory 220 is an example of a (non-transitory) computer readable storage medium, where a repository 229 can be located/managed and/or software 230 can be stored. The repository 229 can database (e.g., an SQL database) and/or another storage mechanism. According to one or more embodiments, the repository 229 can include automations and other data as described herein (e.g., images, segments, hashes, video, frames, source data, robot video, source code, etc.) for access by the software 230. For example, a matching model can be built and stored in the repository 229 during a training phase of the software 230.

In this regard, the repository 229 stores, as training data of the matching model, frames of a video that contain target element/action and a space around that element.

Figure 3:
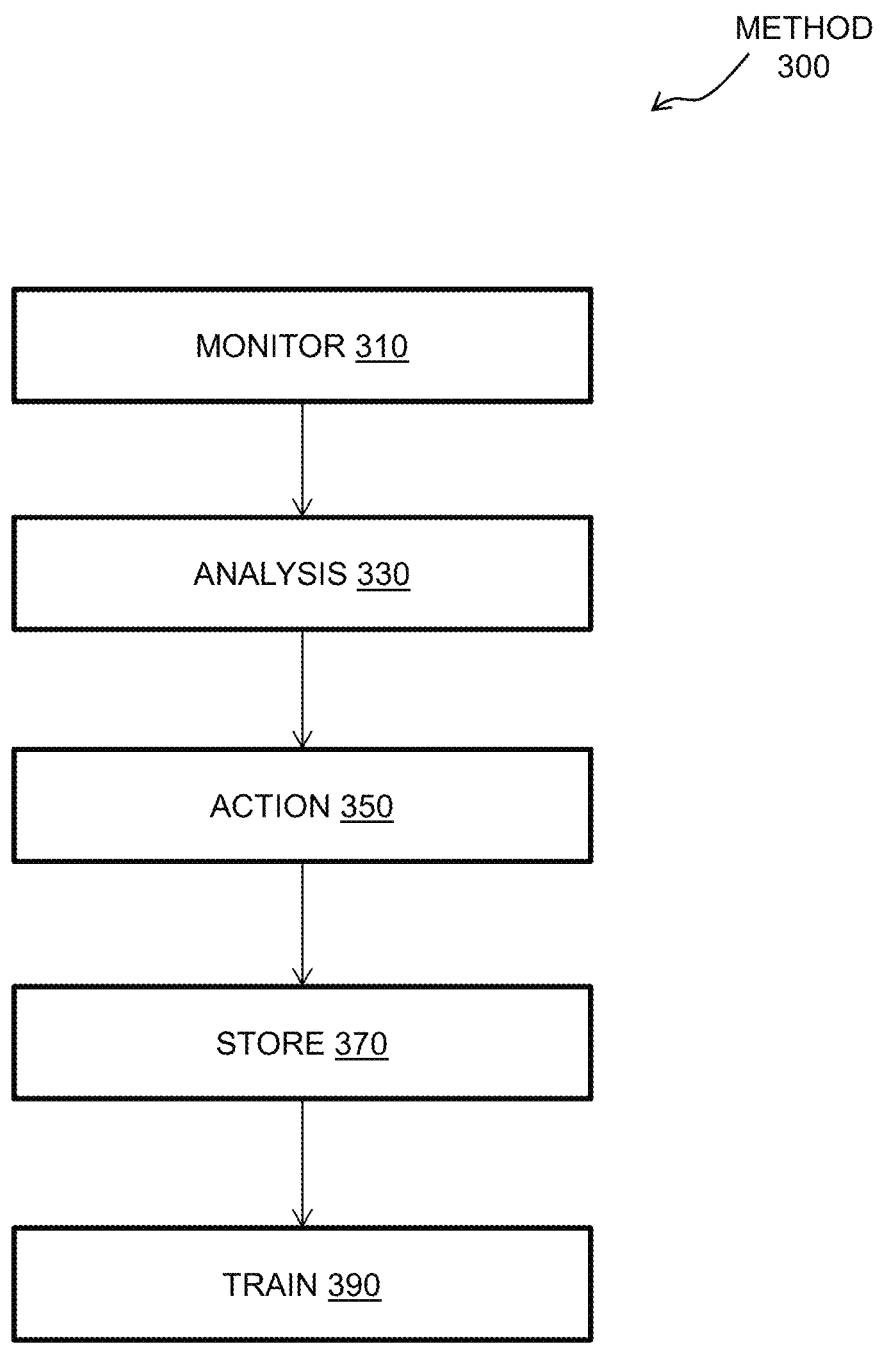
FIG. 3 is a block diagram illustrating a method executed by one or more processors within a local computing system according to one or more embodiments.
Figure 4:
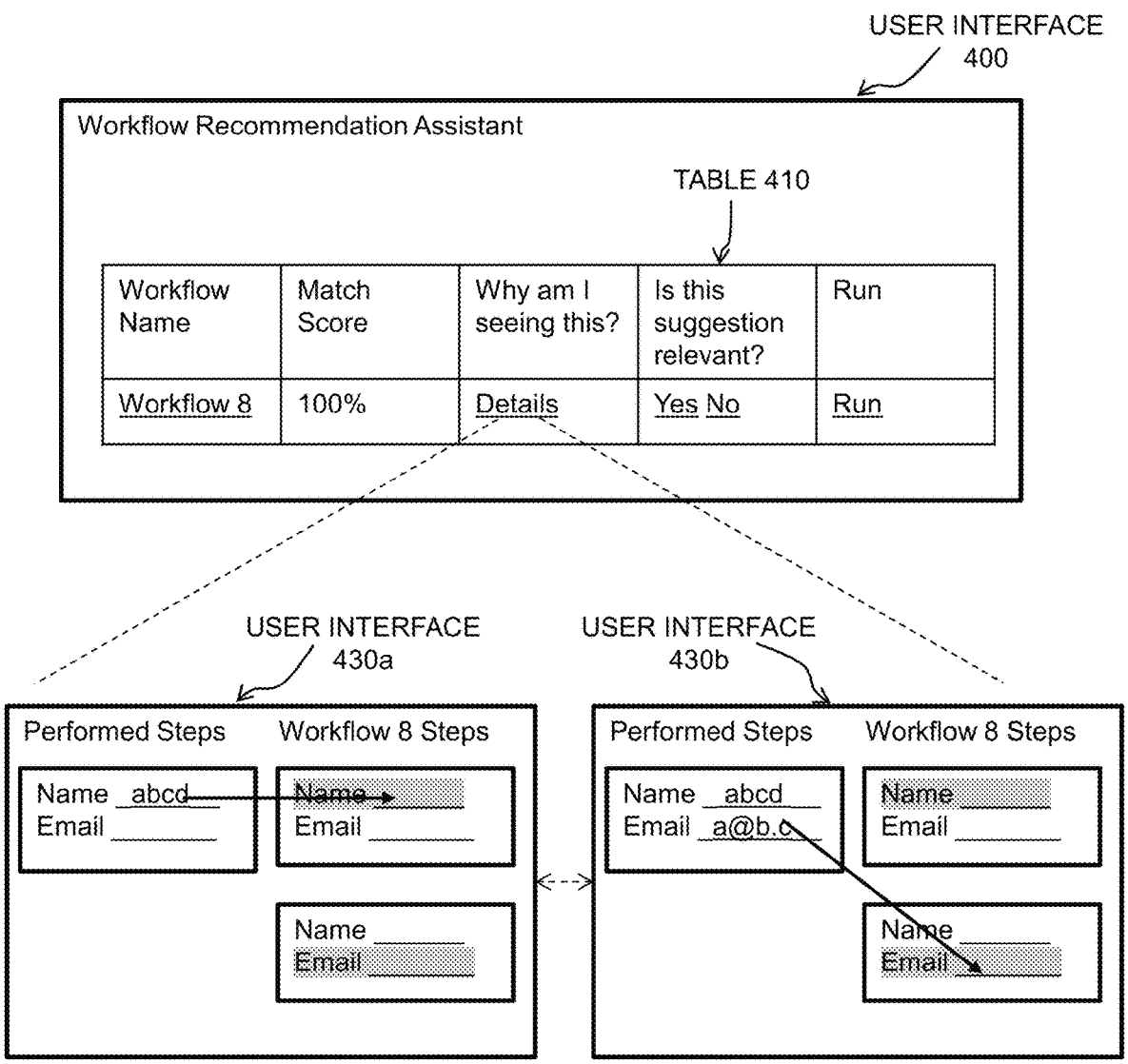
FIG. 4 is an example user interface of a workflow recommendation assistant engine according to one or more embodiments.
Figure 5:
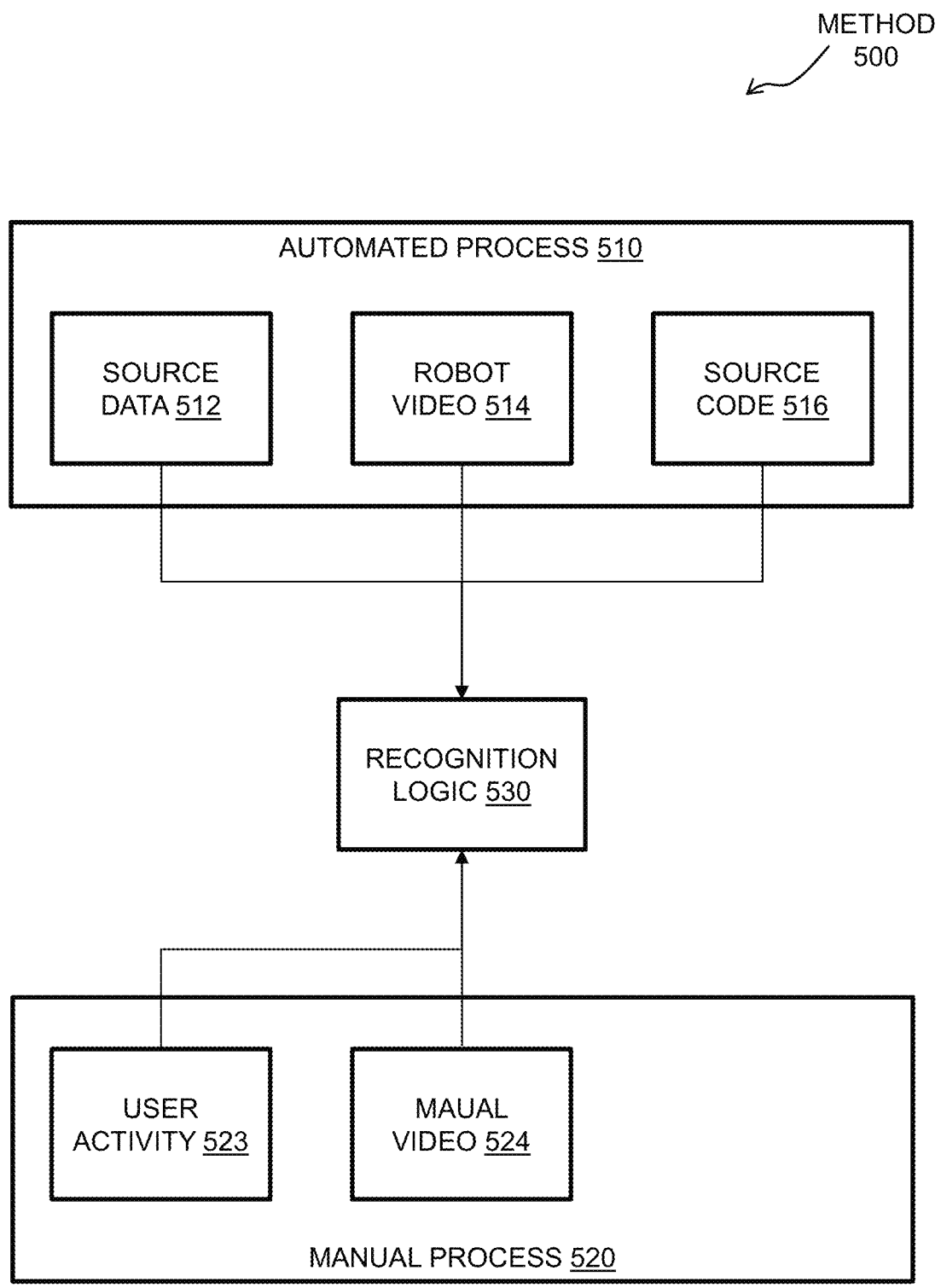
FIG. 5 is a block diagram illustrating a method executed by a workflow recommendation assistant engine according to one or more embodiments.

The software 230 can be stored as software components, modules, engines, instructions, or the like for execution by the processor 210 to cause the device 205 to operate, such as described herein with reference to FIGS. 3-5. The system memory 220 can include any combination of a read only memory (ROM), a random access memory (RAM), internal or external Flash memory, embedded static-RAM (SRAM), solid-state memory, cache, static storage such as a magnetic or optical disk, or any other types of volatile or non-volatile memory. Non-transitory computer readable storage mediums may be any media that can be accessed by the processor 210 and may include volatile media, non-volatile media, or the like. For example, the ROM is coupled to the system bus 215 and may include a basic input/output system (BIOS), which controls certain basic functions of the device 205, and the RAM is read-write memory coupled to the system bus 215 for use by the processors 210. Non-transitory computer readable storage mediums can include any media that is removable, non-removable, or the like.

In connection with FIG. 1, the software 230 of FIG. 2 can be representative of recommendation engine 111 and components therein, such that the memory 220 and the processor 210 can logically design/configure/provide the robot 122, which further performs one or more activities 124 and/or provides one or more user interface (UI) automations 126 using one or more driver components 128 and/or internal engines 129. The software 230 of FIG. 2 can also be representative of an operating system for the device 205 for the computing system 200.

According to one or more embodiments, the software 230 can be configured in hardware, software, or a hybrid implementation. The software 230 can be composed of modules that are in operative communication with one another, and to pass information or instructions. According to one or more embodiments, the software 230 can provide one or more user interfaces, such as on behalf of the operating system or other application and/or directly as needed to provide the intelligent automation experience. The user interfaces include, but are not limited to, internet browsers, graphic user interfaces, window interfaces, and/or other visual interfaces for applications, operating systems, file folders, and the like. Thus, user activity can include any interaction or manipulation of the user interfaces provided by the software 230.

The software 230 can further include custom modules to perform application specific processes or derivatives thereof, such that the computing system 200 may include additional functionality. For example, according to one or more embodiments, the software 230 may be configured to store information, instructions, commands, or data to be executed or processed by the processor 210 to enable operations 231, 232, 233, and 234. For instance, the recommendation engine 111 of FIG. 1 implemented as the software 230 of FIG. 2 can provide a specific configuring and tooling robotic process automation method to the computing system 200, so that the computing system 200 can monitor (231) user activity on the computing device to capture one or more images of a user interface, analyze (232) the one or more images to execute a pattern matching with respect to at least one existing automation, and provide (233) a prompt indicating that the at least one existing automation matches the user activity, along with any other operations/actions (234) described herein. According to one or more embodiments, the software 230 can be configured to preprocess capture images, such as by executing perceptual hashing algorithm that produces a snippet or fingerprint of various forms of multimedia (also known as pHashing or pHash).

Other operations/actions can include, but are not limited to, utilizing RPA agent logs, adding source code metadata to fames when creating robot videos, not recording a cursor when recording a video, eliminating a cursor from a video based on known system cursors, performing key frame caching, pre-building features for automated processes, highlight elements with a shape (e.g., a rectangle) when a robot is running, and querying element shapes when a robot is running.

For example, according to one or more embodiments, the recommendation engine 111 of FIG. 1 implemented as the software 230 of FIG. 2 can perform offloading operations. Offloading operations include identifying an automation and a trigger (e.g., by matching hashes), instead of deliberately coding by the use. In this way, the deliberate coding is offloaded to the recommendation engine 111 of FIG. 1. Additionally, the recommendation engine 111 of FIG. 1 implemented as the software 230 of FIG. 2 provides an ability/option to a user to run the matched automation.

Further, modules of the software 230 can be implemented as a hardware circuit comprising custom very large scale integration (VLSI) circuits or gate arrays, off-the-shelf semiconductors such as logic chips, transistors, or other discrete components, in programmable hardware devices (e.g., field programmable gate arrays, programmable array logic, programmable logic devices), graphics processing units, or the like. Modules of the software 230 can be at least partially implemented in software for execution by various types of processors. According to one or more embodiments, an identified unit of executable code may include one or more physical or logical blocks of computer instructions that may, for instance, be organized as an object, procedure, routine, subroutine, or function. Executables of an identified module co-located or stored in different locations such that, when joined logically together, comprise the module. A module of executable code may be a single instruction, one or more data structures, one or more data sets, a plurality of instructions, or the like distributed over several different code segments, among different programs, across several memory devices, or the like. Operational or functional data may be identified and illustrated herein within modules of the software 230, and may be embodied in a suitable form and organized within any suitable type of data structure.

With respect to the adapters 225, 226, and 227 of FIG. 2, the device 205 can particularly include an input/output (I/O) adapter 225, a device adapter 226, and a communications adapter 227. According to one or more embodiments, the I/O adapter 225 can be configured as a small computer system interface (SCSI), in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication. The device adapter 226 interconnects input/output devices to the system bus 215, such as a display 241, a keyboard 242, a control device 243, or the like (e.g., a camera, a speaker, etc.).

The communications adapter 226 interconnects the system bus 215 with a network 250, which may be an outside network, enabling the device 205 to communicate data with other such devices (e.g., such as the local computing device 255 and, further, the remote computing system 256 through the network 260). In one embodiment, the adapters 225, 226, and 227 may be connected to one or more I/O buses that are connected to the system bus 215 via an intermediate bus bridge. Suitable I/O buses for connecting peripheral devices such as hard disk controllers, network adapters, and graphics adapters typically include common protocols, such as the Peripheral Component Interconnect (PCI).

The display 241 is configured to provide one or more UIs or graphic UIs (GUIs) that can be captured by and analyzes by the software 230, as the users interacts with the device 205. Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The display 241 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The keyboard 242 and the control device 243, such as a computer mouse, a touchpad, a touch screen, a keypad, or the like, may be further coupled to the system bus 215 for input to the device 205. In addition, one or more inputs may be provided to the computing system 200 remotely via another computing system (e.g., the local computing device 255 and/or the remote computing system 256) in communication therewith, or the device 205 may operate autonomously.

According to one or more embodiments, the functionality of the device 205 with respect to the software 230 can also be implemented on the local computing device 255 and/or the remote computing system 256, as represented by separate instances of the recommendation engine 290. Note that the one or more images (e.g., screenshots) can be stored in a common repository (e.g., the repository 229) located at the device 205, the local computing device 255, and/or the remote computing system 256 and can be downloaded (on demand) to and/or from each of the device 205, the local computing device 255, and/or the remote computing system 256.

Turning now to FIG. 3, a block diagram illustrating a process flow 300 executed by one or more processors within a computing system according to one or more embodiments. More particularly, the process flow 300 is an example implementation of the recommendation engine described herein (e.g., the recommendation engine 111 of FIG. 1 and/or the software/recommendation engines 231, 281, and 291 of FIG. 2) to provide a specific configuring and tooling robotic process automation method with respect to the intelligent automation experience.

The process flow 300 begins at block 310, where the recommendation engine monitors user activity. Monitoring user activity can include recording video, capturing one or more frames of a video, capturing images, capturing screen shots, capturing image segments, etc. The recommendation engine can particularly provide a lightweight service (e.g., low system resource usage, such as a small memory footprint and a low CPU usage) running in a background of the computing system that takes hashes of what a user is doing (e.g., captures images). According to one or more embodiments, the recommendation engine can provide a real-time scenario application or a deferred scenario application. The real-time scenario application can use recording software, specialized minimalistic recording, or other software to capture screen shots and native data that is then presently processed. The deferred scenario application can use any recording software described herein to generate screen shots and native data that is stored in a database (e.g., the repository 229) for subsequent review. According to one or more embodiments, the recording software can be implemented by or as part of a robot. For example, the recommendation engine includes providing a lightweight service (e.g., low system resource usage, such as a small memory footprint and a low CPU usage) running in a background (e.g., exists outside a workflow) of a software system that takes hashes of what a user is doing (e.g., captures images).

For example, an attending RPA captures images (e.g., around the user activity or as screen shots) as a user works or operates the computing system (e.g., interacts with a UI or GUI provided by the display 241). The recommendation engine can pre-process the images, and any captured image can be pre-processed in real-time. Pre-processing can include, but is not limited to, segmenting the images, hashing the images or segments, mode reversal, edge detection, step detection, change detection, feature detection, feature extraction, cropping the images, and other enhancements or mechanisms for image processing to improve matching.

According to one or more embodiments of pre-processing, an image and/or a screen shot can be segmented into smaller pieces before the hashes are computed. Then, each and every segment is hashed, using a pHash. Note that any captured image can be hashed as a single bit map. For instance, each pHash can include 8 bytes, with at least 5 hashes representing the segment, captured image, or screen shot. In some cases, one pHash can represent a target of the user activity, while other segments can represent geometric composition (e.g., left, under, top, etc.). Additionally, hashing the images can include a one way encryption that protects confidentiality of the user activity while maintaining the integrity thereof. Note that a size of each hash can be relatively small (e.g., 8 bytes) to a size of a captured image, so it can be distributed.

According to one or more embodiments of pre-processing, mode reversal can include at least changing a user interface between light mode and dark mode. The light and dark modes are color and/or brightness user interface schemes that may be more fit based on time of the day (e.g., day vs. night). According to one or more embodiments of pre-processing, cropping the images can include adjusting and/or sizing screenshots to effectively captures an area around the user activity.

At block 330, the recommendation engine analyzes the captured images or segments thereof. Analyzing the captured images or segments can include pattern matching (e.g., executing a pattern matching of the one or more images and/or sequences with respect to at least one existing automation). According to one or more embodiments, the pattern matching includes checking across the captured images or segments one or more characteristics in some pattern, such as by using a matching model described herein. Characteristics can be a type of action, a number of actions, a proximity of actions, and the like, along with interactions with specific screen or user interface elements (e.g., as buttons, checkboxes, text fields, labels, etc.). For example, each hash of a sequence can be analyzed to extract and compare characteristics to other characteristics of other stored hashes (e.g., representing existing automations), and the generated hashes can be executed in and/or out of sequence and in real-time against the stored hashes to determine whether there is a match. Note that an RPA of the recommendation engine (e.g., the software 230 on the device 205) can provide the sequence of generated hashes, while another instance of the recommendation engine (e.g., on the local computing device 255 and/or the remote computing system 256) can provide the stored hashes.

Characteristics can be determined by/within a window. More particularly, the window can be a buffer that holds a fixed number of captured images or segments. The window can, in turn, be used to optimize a number or variety of characteristics based on this fixed number. In an example, the window can be a sliding window. The size of the sliding window can be increased or decreased, such as dynamically by the recommendation engine, to accommodate a larger or smaller fixed number of captured images or segments. Dynamically sizing the sliding window can be automatic reconfiguration to optimize performance and matching of the recommendation engine.

According to one or more embodiments, when analyzing the captured images or segments thereof, the recommendation engine determines a size of the sliding window and fills the sliding window in a first-in-first-out fashion with a sequence of generated hashes representing the captured images or segments thereof. Then, the sequence of generated hashes in the sliding window are compared to a sequence of stored hashes (e.g., existing automations stored in a repository, such as one located on the repository 229, the local computing device 255, and/or the remote computing system 256 of FIG. 2). More particularly, characteristics of the sequence of generated hashes in the sliding window are compared to characteristics of the sequence of stored hashes. The recommendation engine can use a threshold to determine how loosely or perfectly the characteristics between the generated and stored hashes fit. In this way, if a number of the characteristics of the sequence of generated hashes in the sliding window that fit the characteristics of the sequence of stored hashes is equal to or greater than the threshold, then the recommendation engine determines that there is a match.

At block 350, the recommendation engine executes an action, such as when there is a match. The action includes presenting the match to the user.

For example, an RPA of the recommendation engine causes the UI or GUI provided by the display 241 to preset a prompt indicating that an existing automation matches the present set of user actions (i.e., characteristics determined from the captured images in the window). The prompt of the RPA further provides an option to the user for the existing automation to takeover or execute and/or requests to set a trigger. The prompt can also present or include a mechanism to present a visual reference of what matched (e.g., so the user can see how their specific actions resulted in the match). A trigger can be a user defined conditions that start an automation. One or more triggers can be used to start any particular automation so that particular automation can start in multiple ways. According to one or more embodiments, the recommendation engine can perform deliberate action with respect to the triggers. If a repository includes 10 automations that the recommendation engine can automatically trigger, the recommendation engine can either create and run a new automation package that has 10 triggers that when fired invokes the 10 automations or can run the 10 automations in the background so that each automation awaits its internal trigger for automatic invocation.

Turning to FIG. 4, a user interface 400 is shown according to one or more embodiments. The user interface 400 is an example of a prompt with respect to block 350 of the FIG. 3. The user interface 400 is titled "Workflow Recommendation Assistant" and includes a table 410 showing matching automations. The table 410 includes columns, such as workflow name, match score, details, relevancy (e.g., a Yes/No vote on applicability), and execution. In this example, only a sign matching automation is shown (e.g., 'Workflow 8'). Note that, because names of the one or more automated processes are not always descriptive (e.g., Workflow 8), the recommendation engine can add a description (e.g., a purpose) to verify that a user action was matched to a relevant automation in accordance with one or more embodiments. With respect to the match score, the recommendation engine can determine on a scale how close a manual process matches an existing automation. For instance, if a threshold is set to 99%, then only existing automations that receive a score equal to or greater than this threshold can be presented. The table 410 show a score of 100%. Note that the threshold can be set to any value from 0 to 100 based on the dynamic configuration of the recommendation engine described herein. Further, the recommendation engine can include one or more inference with respect to one or more thresholds so that a cascade of existing automations can be presented by the user interface 400. For instance, the recommendation engine can populate in the table 410 only existing automations that are equal to or greater than 95% accurate, while enabling any existing automations that are at least 80% accurate to be discoverable.

One or more of the items of the table 410 can be selectable, as indicated by the underlined text. For instance, selecting Workflow 8 can drive a subsequent prompt to see a source code thereof. Further, selecting Yes or No provides a direct user feedback to the recommendation engine as to whether Workflow 8 is a match, and selecting Run can cause Workflow 8 to execute. With respect to selecting Details, a subsequent prompt shown as user interfaces 430*a* and 430*b* are displayed to show the user how the automatic matching was performed. In this regard, the subsequent prompt toggles between one or more views (e.g., user interface 430*a* at time 0 and user interfaces 430*b* at time 0+1) while illustrating with arrows how the Performed Steps match the Workflow 8 Steps.

At block 370, the recommendation engine stores the sequence of generated hashes with the sequence of stored hashes, as well as any triggers, to increase the repository for further matching. This storing further contributes to building and/or enhancing a matching model for machine learning. In turn, at block 390, the recommendation engine trains on the matching model to better identify when a match can be approximated. In this way, the recommendation engine can feedback information from the training to dynamically adjust the sliding window, select characteristic, determine a scope of captured images, and the like. According to one or more embodiments, training of the recommendation engine can include capturing frames images, segments, and/or hashes, while attempting to make a match (e.g., with respect to comparing geometric compositions or the like). In this regard, the recommendation engine monitors a user performing one or more steps of a process and uses the captured frames images, segments, and/or hashes to build the repository. For instance, the recommendation engine stores and uses, as training data, frames of a video that contain target element/action and a space around that element.

Thus, one or more technical effects, advantages, and benefits of the method 300 of FIG. 3, as recommendation engine 111 of FIG. 1 implemented as the software 230 of FIG. 2, include identifying whether a process underdevelopment is already developed (e.g., or a part thereof), analyzing complex processes through complex inferences (e.g., less probability that an observed activity is exactly the one automated), considering whether to provide an indication (e.g., screen matching) based on confidence levels (e.g., scores for screen process matching), and suggesting at least pre-build components even if the whole automated workflow is not matched.

Figure 6:
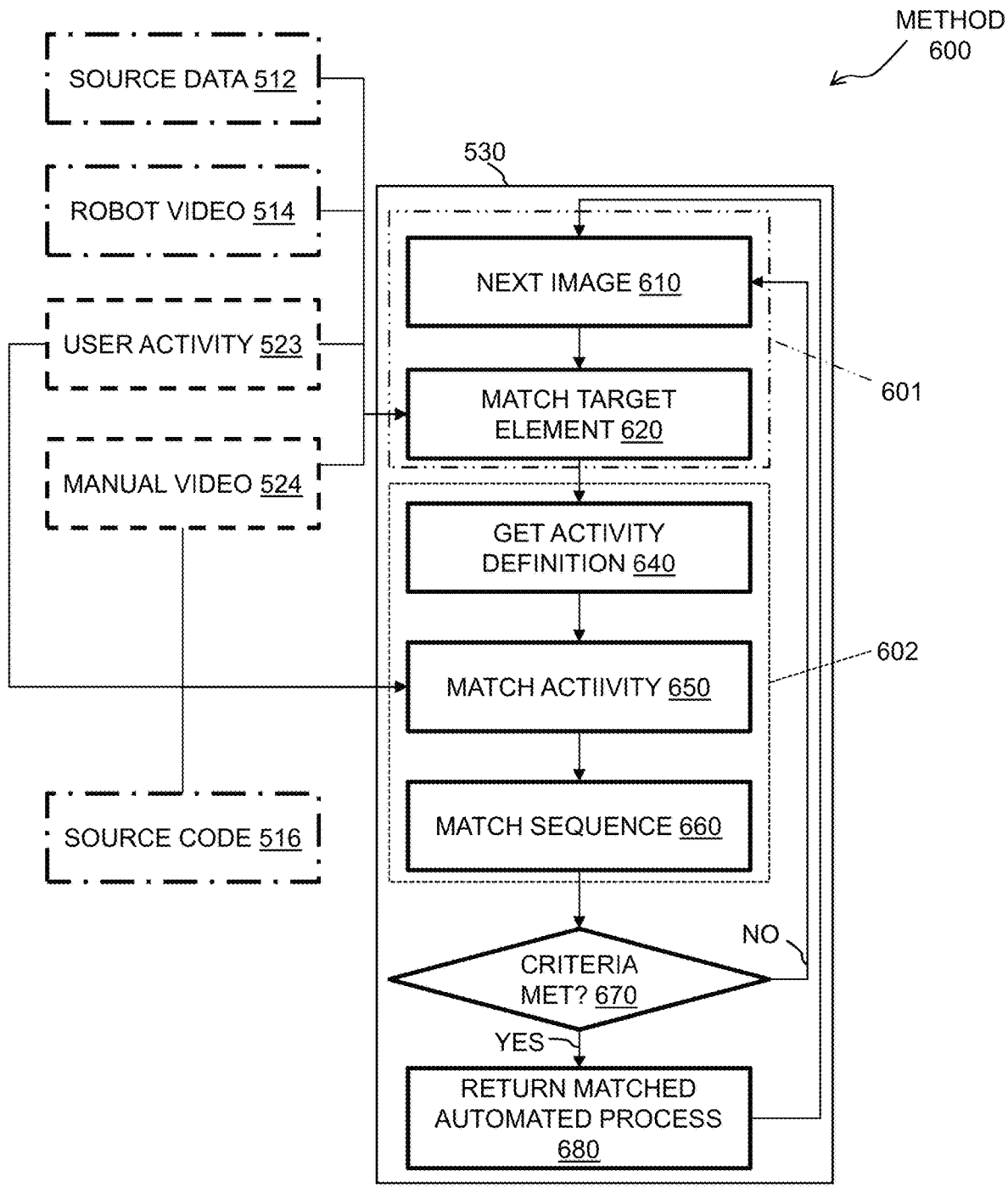
FIG. 6 is a block diagram illustrating a method executed by a workflow recommendation assistant engine according to one or more embodiments.

Turning to FIGS. 5-6, a block diagrams illustrating methods 500 and 600 executed by the environment 100 of FIG. 1 and/or the computing system 200 of FIG. 2 according to one or more embodiments. Note that the method 600 of FIG. 6 further describes the method 500 of FIG. 5.

The method 500 begins at block 510, where the software 230 retrieves one or more automated processes (e.g., automated workflows) from a repository. In this regard, source data 512, robot video 514, and source code 516 from the each of the one or more automated processes are used as inputs for a comparison (e.g., at block 530). The source data 512 can be any source data that contains screen shots of elements (e.g., characteristics) that are targets of the automated workflows. The source data 512 can be created in a mobile device environment. The robot video 514 includes captured images of the running robots (RPAs) during the automated workflows. The source code 516 includes any underlying of the automated workflows and/or the robots.

At block 520, the software 230 captures a manual process. In this regard, user activity 523 and screen video 524 from the manual process are used as inputs for the comparison (e.g., at block 530). The user activity 523 can be characteristics (e.g., user actions) or any source data that contains screen shots of elements that are targets of the manual process. The user activity 523 can be identified on a pixel basis and/or through optical character recognition (OCR) operations. The screen video 524 includes captured images of the manual process.

At block 530, the software 230 executes recognition logic to perform a comparison between the one or more automated processes of block 510 and the manual process of block 520. In this regard, the recognition logic of the software 230 matches user actions with existing automations. Note that the recognition logic can be expanded to include other forms of process documentation, such as to detect standard operating procedures and/or, very frequent action sequences (for which there is no documentation or automation to prompt the user).

Turning to FIG. 6, a method 600 describes an example operation of the recognition logic of block 530 of FIG. 5 according to one or more embodiments. Note that elements and items that are similar to FIG. 5 are reused in FIG. 6 for ease of explanation. In this regard, elements such as the source data 512, the robot video 514, and the source code 516 from an automated process (indicated by the dash-doted lines) and the user activity 523 and the screen video 524 from a manual process (indicated by the dashed lines) are reused as inputs to the method 600, which further occurs within the recognition logic 530. Further, note that block 601 is a core function to the recognition logic 530, while block 602 is optional. In this regard each image within a window is viewed in turn, at block 610, so that target elements can be matched at block 620 in accordance with the inputs 512, 514, 523, and 524.

With respect to optional block 602, the recommendation engine can further get activity definitions from source code at block 640, match activity at block 650, and match sequences at block 660 in accordance with the inputs 516, 523, and 524.

At decision block 670, the recommendation engine determines if a match criteria is met. If the march criteria is not met, then the method 600 returns to block 610 (as indicated by the NO arrow). If the march criteria is met, then the method 600 proceeds to block 680 (as indicated by the YES arrow). At block 680, the recommendation engine returns the matched automated process via a prompt as described herein. According to one or more embodiments, the recommendation engine can also be used when a user (e.g., an RPA developer) is creating a new automation. In this regard, the recommendation engine can check what activities the user is performing and present the user with information that a corresponding automation already exists.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computing system comprising:
    a memory configured to store processor executable instructions for a workflow recommendation assistant engine; and
    at least one processor coupled to the memory,
    wherein the at least one processor is configured to execute the workflow recommendation assistant engine to cause the computing system to perform:
        filling a sliding window in a first-in-first-out fashion with a sequence of a fixed number of one or more corresponding hashes comprising action characteristics, the action characteristics comprising a type of action, a number of actions, a proximity of actions, and interactions with a user interface;
        pattern matching the one or more corresponding hashes in the sliding window by comparing the action characteristics in and out of sequence to target characteristics of each of a plurality of robotic process automations to determine a match set of robotic process automations from the plurality of robotic process automations; and
        presenting via a prompt the match set of robotic process automations in the user interface.

2. The computing system of claim 1, wherein the at least one processor is configured to execute the workflow recommendation assistant engine to cause the computing system to perform:
    pre-processing one or more images of the user interface captured during user activity to generate the one or more corresponding hashes,
    wherein the pre-processing of the one or more images is executed with respect to a mode reversal of the user interface.

3. The computing system of claim 1, wherein the at least one processor is configured to execute the workflow recommendation assistant engine to cause the computing system to perform:
    capturing an area around user activity of one or more images of the user interface.

4. The computing system of claim 1, wherein the prompt comprises an option to execute or an option for setting a trigger for each of the robotic process automations of the match set.

5. The computing system of claim 1, wherein the pattern matching of the one or more corresponding hashes is performed against a repository of existing robotic automations hashes for the plurality of robotic process automations.

6. The computing system of claim 1, wherein the action characteristics comprise utilizing robotic process automation agent logs, adding source code metadata to frames when creating robotic process automation videos, performing key frame caching, or querying element shapes when a robotic process automation is running.

7. A method implemented by a workflow recommendation assistant engine stored as processor executable instructions in a memory coupled to at least one processor, the method comprising:
    filling a sliding window in a first-in-first-out fashion with a sequence of a fixed number of one or more corresponding hashes comprising action characteristics, the action characteristics comprising a type of action, a number of actions, a proximity of actions, and interactions with a user interface;

pattern matching the one or more corresponding hashes in the sliding window by comparing the action characteristics in and out of sequence to target characteristics of each of a plurality of robotic process automations to determine a match set of robotic process automations from the plurality of robotic process automations; and presenting via a prompt the match set of robotic process automations in the user interface.

8. The method of claim 7, wherein the method comprises:

pre-processing one or more images of the user interface captured during user activity to generate the one or more corresponding hashes, wherein the pre-processing of the one or more images is executed with respect to a mode reversal of the user interface.

9. The method of claim 7, wherein the method comprises:

capturing an area around user activity of one or more images of the user interface.

10. The method of claim 7, wherein the prompt comprises an option to execute or an option for setting a trigger for each of the robotic process automations of the match set.

11. The method of claim 7, wherein the pattern matching of the one or more corresponding hashes is performed against a repository of existing robotic automations hashes for the plurality of robotic process automations.

12. The method of claim 7, wherein the action characteristics comprise utilizing robotic process automation agent logs, adding source code metadata to frames when creating robotic process automation videos, performing key frame caching, or querying element shapes when a robotic process automation is running.

13. A non-transitory computer readable medium storing program code for a workflow recommendation assistant engine, the program code being executable by at least one processor to cause the workflow recommendation assistant engine to perform:

filling a sliding window in a first-in-first-out fashion with a sequence of a fixed number of one or more corresponding hashes comprising action characteristics, the action characteristics comprising a type of action, a number of actions, a proximity of actions, and interactions with a user interface;

pattern matching the one or more corresponding hashes in the sliding window by comparing the action characteristics in and out of sequence to target characteristics of each of a plurality of robotic process automations to determine a match set of robotic process automations from the plurality of robotic process automations; and presenting via a prompt the match set of robotic process automations in the user interface.

14. The non-transitory computer readable medium of claim 13, wherein the at least one processor is configured to execute the program code to cause the workflow recommendation assistant engine to perform:

pre-processing one or more images of the user a user interface captured during user activity to generate the one or more corresponding hashes, wherein pre-processing of the one or more images is executed with respect to a mode reversal of the user interface.

15. The non-transitory computer readable medium of claim 13, wherein the at least one processor is configured to execute the program code to cause the workflow recommendation assistant engine to perform:

capturing an area around user activity of one or more images of the user interface.

16. The non-transitory computer readable medium of claim 13, wherein the prompt comprises an option to execute or an option for setting a trigger for each of the robotic process automations of the match set.

17. The non-transitory computer readable medium of claim 13, wherein the pattern matching of the one or more corresponding hashes is performed against a repository of existing robotic automations hashes for the plurality of robotic process automations.

18. The non-transitory computer readable medium of claim 13, wherein the action characteristics comprise utilizing robotic process automation agent logs, adding source code metadata to frames when creating robotic process automation videos, performing key frame caching, or querying element shapes when a robotic process automation is running.

* * * * *